US012415755B2

(12) United States Patent
Okada

(10) Patent No.: US 12,415,755 B2
(45) Date of Patent: Sep. 16, 2025

(54) RHEOLOGY MODIFYING AGENT

(71) Applicant: KAO CORPORATION, Tokyo (JP)

(72) Inventor: Kohei Okada, Wakayama (JP)

(73) Assignee: KAO CORPORATION, Tokyo (JP)

( * ) Notice: Subject to any disclaimer, the term of this patent is extended or adjusted under 35 U.S.C. 154(b) by 1165 days.

(21) Appl. No.: 17/289,796

(22) PCT Filed: Oct. 10, 2019

(86) PCT No.: PCT/JP2019/040005
§ 371 (c)(1),
(2) Date: Apr. 29, 2021

(87) PCT Pub. No.: WO2020/095613
PCT Pub. Date: May 14, 2020

(65) Prior Publication Data
US 2021/0395145 A1    Dec. 23, 2021

(30) Foreign Application Priority Data

Nov. 9, 2018    (JP) .................................. 2018-211094

(51) Int. Cl.
C04B 24/12    (2006.01)
C04B 28/04    (2006.01)
C04B 40/00    (2006.01)
C04B 103/00   (2006.01)

(52) U.S. Cl.
CPC .......... C04B 24/121 (2013.01); C04B 24/124 (2013.01); C04B 28/04 (2013.01); C04B 40/0046 (2013.01); C04B 2103/0079 (2013.01)

(58) Field of Classification Search
CPC ..... C04B 24/121; C04B 24/124; C04B 28/04; C04B 40/0046; C04B 2103/0079; C04B 40/0039; C09K 3/00
See application file for complete search history.

(56) References Cited

U.S. PATENT DOCUMENTS

| 3,389,178 | A | * | 6/1968 | Fields | ................... | C07C 291/04 |
| | | | | | | 564/297 |
| 4,224,076 | A | * | 9/1980 | Moitra | ................... | C04B 24/12 |
| | | | | | | 106/725 |
| 4,714,610 | A | * | 12/1987 | Gerstein | ................. | A61Q 5/12 |
| | | | | | | 424/70.27 |
| 2010/0209363 | A1 | * | 8/2010 | Ge | ......................... | A61Q 5/02 |
| | | | | | | 424/59 |
| 2011/0046282 | A1 | * | 2/2011 | Mizuta | ................ | C09D 123/18 |
| | | | | | | 524/186 |
| 2012/0269747 | A1 | | 10/2012 | Himura et al. | | |
| 2013/0266531 | A1 | | 10/2013 | Yuan-Huffman et al. | | |
| 2016/0312958 | A1 | * | 10/2016 | Sun | .......................... | F17D 1/17 |
| 2018/0029935 | A1 | | 2/2018 | Saida et al. | | |
| 2018/0086669 | A1 | | 3/2018 | Tanaka et al. | | |
| 2019/0117528 | A1 | | 4/2019 | Heffernan et al. | | |
| 2019/0133905 | A1 | * | 5/2019 | Heffernan | ............. | A61K 8/463 |
| 2019/0231672 | A1 | * | 8/2019 | Li | ........................ | A61K 8/463 |

FOREIGN PATENT DOCUMENTS

| CN | 103261365 A | | 8/2013 |
| CN | 106062059 A | | 10/2016 |
| CN | 107108356 A | | 8/2017 |
| CN | 107428611 A | | 12/2017 |
| JP | 05320692 A | * | 12/1993 |
| JP | H0812397 A | | 1/1996 |
| JP | H08133805 A | | 5/1996 |
| JP | 2001213859 A | | 8/2001 |
| JP | 2010065189 A | | 3/2010 |
| JP | 2014502602 A | | 2/2014 |
| JP | 2017214251 A | * | 12/2017 |
| JP | 2018062658 A | | 4/2018 |
| WO | WO-2011049246 | | 4/2011 |
| WO | WO-2015047260 A1 | | 4/2015 |
| WO | WO-2015094783 A1 | | 6/2015 |
| WO | WO-2017187125 A1 | | 11/2017 |

OTHER PUBLICATIONS

National Center for Biotechnology Information (2024). PubChem Compound Summary for CID 6435847, Oleamine oxide. and National Center for Biotechnology Information (2024). PubChem Compound Summary for CID 17388, 1-Octadecanamine, N, N-dimethyl-, N-oxide; accessed Jul. 15, 2024. (Year: 2024).*
MT JP2017214251A (Year: 2017).*
English machine translation of JP-05320692-A (Year: 1993).*
International Search Report issued Dec. 10, 2019 in PCT/JP2019/040005 (with English translation), 5 pages.
Extended European Search Report issued Jun. 29, 2022 in Patent Application No. 19881984.9, 6 pages.
Combined Chinese Office Action and Search Report issued Feb. 2, 2023 in Patent Application No. 201980053336.5 (with partial English translation), 12 pages.
Written Opinion issued Dec. 10, 2019 in PCT/JP2019/040005 (with English translation of International Preliminary Report on Patentability and Written Opinion), 13 pages.

* cited by examiner

*Primary Examiner* — Amber R Orlando
*Assistant Examiner* — Jeffrey Eugene Barzach
(74) *Attorney, Agent, or Firm* — Element IP, PLC

(57) ABSTRACT

Rheology modifying agent that provides a rheology modifying effect over a wide temperature region. The rheology modifying agent contains amine oxide compounds represented by reference formulae (1a) and reference formulae (1b). Slurry. Method for producing a slurry.

16 Claims, No Drawings

RHEOLOGY MODIFYING AGENT

FIELD OF THE INVENTION

The present invention relates to a rheology modifying agent.

BACKGROUND OF THE INVENTION

In many industrial products utilized in the form of aqueous solutions or slurries, various types of additives are used for the purpose of improving their physical properties. For example, in order to modify the rheology of aqueous solutions or slurries, the proper adjustment of the viscosity depending on the purposes or applications may be desirable. Conventionally, in order to adjust the viscosity of aqueous solutions or slurries, a measure such as the addition of thickeners or viscosity reducers, heating or cooling operation, the adjustment of electrolyte concentrations or the like has been adopted. In addition, surfactants have been known to affect the viscosity, elasticity, thickening properties or the like of aqueous solutions or slurries (JP-A 2014-502602 and JP-A H8-133805).

Rheology modifying agents are sometimes used in hydraulic slurries containing hydraulic powders, such as cement, to improve their physical properties, such as viscosity, material separation resistance and the like. JP-A 2010-065189 discloses a rheology modifying agent which contains a specific quaternary salt compound including a quaternary cation group and an aromatic anion group and an anionic aromatic compound at a specific cation group/(anion group+anionic aromatic compound) molar ratio.

SUMMARY OF THE INVENTION

The present invention provides a rheology modifying agent that develops a rheology modifying effect over a wide temperature region.

The present invention relates to a rheology modifying agent containing two or more types of compounds represented by the following general formula (1), wherein the two or more types of compounds differ in X in the general formula (1) and at least one of the two or more types of compounds is a compound in which $R^{1a}$ or $R^{1b}$ of X in the general formula (1) is an alkenyl group.

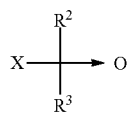
(1)

wherein X is a group represented by $R^{1a}$ or $R^{1b}$—[CONH—CH$_2$CH$_2$CH$_2$]$_n$—; $R^{1a}$ is an alkyl group with 14 or more and 22 or less carbons or an alkenyl group with 14 or more and 22 or less carbons; $R^{1b}$ is an alkyl group with 13 or more and 21 or less carbons or an alkenyl group with 13 or more and 21 or less carbons; n is an integer of 1 or more and 3 or less; each of $R^2$ and $R^3$ is independently an alkyl group with 1 or more and 4 or less carbons or a group represented by —(C$_2$H$_4$O)$_p$H; and p is an average number of added moles and a total for $R^2$ and $R^3$ is a number of 0 or more and 5 or less.

In addition, the present invention relates to a slurry composition containing the rheology modifying agent of the present invention, water and a powder.

Moreover, the present invention relates to a method for producing a slurry composition including mixing the rheology modifying agent of the present invention, water and a powder.

According to the present invention, provided is a rheology modifying agent that develops a rheology modifying effect over a wide temperature region. The rheology modifying agent of the present invention can modify the rheology, such as, for example, viscosity or elasticity, of aqueous solutions or slurries over a wide temperature region.

EMBODIMENTS OF THE INVENTION

Rheology Modifying Agent

A rheology modifying agent of the present invention contains two or more types of compounds represented by the following general formula (1) [hereinafter, also referred to as compound (1)]. Further, the two or more types of compounds differ from one another in X in the general formula (1) and at least one of the two or more types of compounds is a compound in which $R^{1a}$ or $R^{1b}$ of X in the general formula (1) is an alkenyl group.

Considering, by way of example, the case of having two types of compounds (1), examples that compounds (1) differ in X in the general formula (1) include, for example, the following modes. Note that, in the following modes, $R^{1a}$ or $R^{1b}$ of at least one compound (1) of the two types of compounds (1) is an alkenyl group.

(i) $R^{1a}$ or $R^{1b}$ of one of them is an alkyl group and $R^{1a}$ or $R^{1b}$ of the other is an alkenyl group.

(ii) the carbon number of $R^{1a}$ or $R^{1b}$ of one of them and that of $R^{1a}$ or $R^{1b}$ of the other are different.

(iii) X of one of them is $R^{1a}$ and X of the other is $R^{1b}$—[CONH—CH$_2$CH$_2$CH$_2$]$_n$—.

(iv) X is $R^{1b}$—[CONH—CH$_2$CH$_2$CH$_2$]$_n$— for both and n of one of them is different from that of the other.

(v) combinations of the above (i) to (iv).

In the general formula (1), X is a group represented by $R^{1a}$ or $R^{1b}$—[CONH—CH$_2$CH$_2$CH$_2$]$_n$—.

$R^{1a}$ is an alkyl group with 14 or more and 22 or less carbons or an alkenyl group with 14 or more and 22 or less carbons.

When $R^{1a}$ is an alkenyl group, it has preferably 18 or more and preferably 22 or less carbons.

When $R^{1a}$ is an alkyl group, it has preferably 16 or more and preferably 22 or less carbons.

$R^{1b}$ is an alkyl group with 13 or more and 21 or less carbons or an alkenyl group with 13 or more and 21 or less carbons.

When $R^{1b}$ is an alkenyl group, it has preferably 17 or more and preferably 21 or less carbons.

When $R^{1b}$ is an alkyl group, it has preferably 15 or more and preferably 21 or less carbons.

n is preferably 0 or 1.

Each of $R^2$ and $R^3$ is independently preferably an alkyl group with 1 or more and 2 or less carbons or a group represented by —(C$_2$H$_4$O)$_p$H.

p is a number of preferably 0 or more and 3 or less.

The rheology modifying agent of the present invention contains two or more types and preferably five or less types and more preferably two types of compounds (1) that differ in X in the general formula (1). Further, at least one of the two or more types of compounds (1) contained in the rheology modifying agent is a compound in which $R^{1a}$ or $R^{1b}$ of X in the general formula (1) is an alkenyl group with 14 or more and 22 or less carbons, that is, a compound including an alkenyl group with 14 or more and 22 or less carbons as $R^{1a}$ or an alkenyl group with 13 or more and 21 or less carbons as $R^{1b}$ in X in the general formula (1).

In the present invention, it is preferable that there should be two types of compounds (1), and of the two types of compounds (1), which include the above (i) to (v), one should be a compound in which X in the general formula (1) is $R^{1a}$ and an alkenyl group with 14 or more and 22 or less carbons. That is, examples of the rheology modifying agent of the present invention include a rheology modifying agent containing two types of compounds represented by the general formula (1), wherein the two types of compounds differ in X in the general formula (1) and one of the two types of compounds is a compound in which X in the general formula (1) is $R^{1a}$ and $R^{1a}$ is an alkenyl group.

Examples of the rheology modifying agent of the present invention include a rheology modifying agent containing compound (1a) in which X in the general formula (1) is a group represented by $R^{1a}$ or $R^{1b}$—[CONH—$CH_2CH_2CH_2$]$_n$— (provided that $R^{1a}$ is an alkenyl group with 14 or more and 22 or less carbons and $R^{1b}$ is an alkenyl group with 13 or more and 21 or less carbons) and compound (1b) which differs from compound (1a) in X in the general formula (1).

Specific examples thereof include a rheology modifying agent containing compound (1a) represented by the following general formula (1a) and compound (1b) represented by the following general formula (1b).

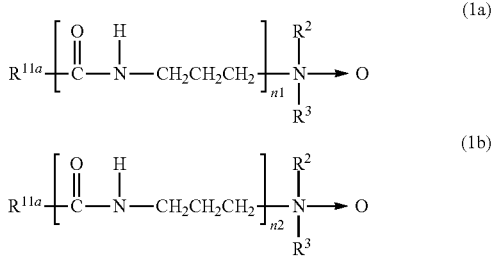

wherein
each of n1 and n2 is independently an integer of 0 or more and 3 or less;
$R^{11a}$ is an alkenyl group with 14 or more and 22 or less carbons when n1 is 0 and an alkenyl group with 13 or more and 21 or less carbons when n1 is 1 to 3;
$R^{11b}$ is an alkyl group with 14 or more and 22 or less carbons or an alkenyl group with 14 or more and 22 or less carbons when n2 is 0 and an alkyl group with 13 or more and 21 or less carbons or an alkenyl group with 13 or more and 21 or less carbons when n2 is 1 to 3;
provided that an alkenyl group of $R^{11b}$ is an alkenyl group which is different from $R^{11a}$ when n1 and n2 are the same number;
each of $R^2$ and $R^3$ is independently an alkyl group with 1 or more and 4 or less carbons or a group represented by —$(C_2H_4O)_pH$; and p is an average number of added moles and a total for $R^2$ and $R^3$ is a number of 0 or more and 5 or less.

In the general formula (1a), $R^{11a}$ has preferably 17 or more and preferably 22 or less carbons.

In the general formula (1a), n1 is preferably 0 or 1 and more preferably 0.

In the general formula (1b), when n2 is 0 and $R^{11b}$ is an alkyl group, $R^{11b}$ has preferably 16 or more and preferably 22 or less carbons.

In the general formula (1b), when n2 is 0 and $R^{11b}$ is an alkenyl group, $R^{11b}$ has preferably 18 or more and preferably 22 or less carbons.

In the general formula (1b), when n2 is 1 to 3 and $R^{11b}$ is an alkyl group, $R^{11b}$ has preferably 15 or more and preferably 21 or less carbons.

In the general formula (1b), when n2 is 1 to 3 and $R^{11b}$ is an alkenyl group, $R^{11b}$ has preferably 17 or more and preferably 21 or less carbons.

In the general formula (1b), $R^{11b}$ is preferably an alkyl group.

In the general formula (1b), n2 is preferably 0 or 1.

In the general formula (1a) or (1b), each of $R^2$ and $R^3$ is independently preferably an alkyl group with 1 or 2 carbons or a group represented by —$(C_2H_4O)_pH$ and more preferably an alkyl group with 1 or 2 carbons.

In the general formula (1a) or (1b), p is a number of preferably 0 or more and 3 or less.

When n1 and n2 are the same number, an alkenyl group of $R^{11b}$ is an alkenyl group which is different from $R^{11a}$.

Preferable examples of the rheology modifying agent of the present invention include a rheology modifying agent containing compound (11a) represented by the following general formula (11a) and compound (1b) represented by the following general formula (1b).

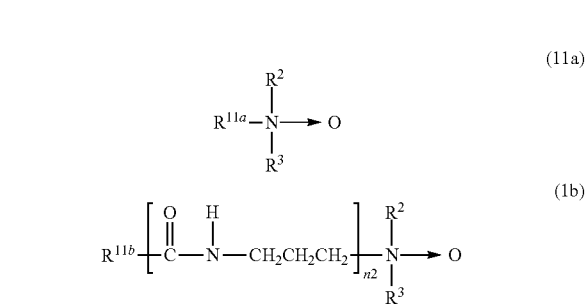

wherein
n2 is an integer of 0 or more and 3 or less;
$R^{11a}$ is an alkenyl group with 14 or more and 22 or less carbons;
$R^{11b}$ is an alkyl group with 14 or more and 22 or less carbons or an alkenyl group with 14 or more and 22 or less carbons when n2 is 0 and an alkyl group with 13 or more and 21 or less carbons or an alkenyl group with 13 or more and 21 or less carbons when n2 is 1 to 3;
each of $R^2$ and $R^3$ is independently an alkyl group with 1 or more and 4 or less carbons or a group represented by —$(C_2H_4O)_pH$; and p is an average number of added moles and a total for $R^2$ and $R^3$ is a number of 0 or more and 5 or less.

Compound (11a) represented by the general formula (11a) corresponds to a compound in which n1 is 0 in the general formula (1a). Preferable modes of $R^{11a}$, $R^2$ and $R^3$ in the general formula (11a) are the same as in the general formula (1a). Preferable modes of compound (1b) in this combination are also the same as those mentioned above.

In the rheology modifying agent of the present invention, a mass ratio of compound (1b)/compound (1a) is preferably 5/95 or more, more preferably 25/75 or more and further preferably 40/60 or more, and preferably 95/5 or less, more preferably 75/25 or less and further preferably 60/40 or less from the viewpoint of obtaining a rheology modifying effect, for example, high viscoelasticity, over a wider temperature region.

In the rheology modifying agent of the present invention, a mass ratio of compound (1b)/compound (11a) is preferably 5/95 or more, more preferably 25/75 or more and further preferably 40/60 or more, and preferably 95/5 or less, more preferably 75/25 or less and further preferably 60/40 or less from the viewpoint of obtaining a rheology modifying effect, for example, high viscoelasticity, over a wider temperature region.

The rheology modifying agent of the present invention can include water.

The rheology modifying agent of the present invention may be a rheology modifying agent composition when it contains a component other than compound (1).

The rheology modifying agent of the present invention contains compound (1) in an amount of, for example, preferably 1 mass % or more and more preferably 10 mass % or more, and preferably 100 mass % or less in total. The rheology modifying agent of the present invention may contain compound (1) in an amount of 100 mass %, i.e., may be composed of compound (1).

In the rheology modifying agent of the present invention, the content of a compound having the same structure as compound (1) and having an alkyl group or alkenyl group with a small number of carbons is preferably smaller. Specifically, the content of an amine oxide having an alkyl group with less than 14 carbons, an alkenyl group with less than 14 carbons or an acyl group with less than 14 carbons (hereinafter, also referred to as a short-chain amine oxide) is preferably smaller. The rheology modifying agent of the present invention contains a short-chain amine oxide at a mass ratio of total content of short-chain amine oxide/total content of compound (1) of preferably 50/50 or less, more preferably 25/75 or less, further preferably 10/90 or less, and furthermore preferably 0/100, that is, does not contain a short-chain amine oxide. Considering in terms of the general formula (1) for convenience, a short-chain amine oxide corresponds to a compound in which $R^{1a}$ of X in the general formula (1) is an alkyl group with less than 14 carbons or an alkenyl group with less than 14 carbons, and a compound in which $R^{1b}$ is an alkyl group with less than 13 carbons or an alkenyl group with less than 13 carbons.

The rheology modifying agent of the present invention can contain one or more compounds (hereinafter, also referred to as polyether compounds) selected from polyethylene glycols with weight average molecular weights of 500 or more and preferably 200000 or less, polypropylene glycols with weight average molecular weights of 500 or more and preferably 5000 or less, copolymers of ethylene oxides and propylene oxides, with weight average molecular weights of 500 or more and preferably 30000 or less, and ether compounds having hydrocarbon groups, preferably hydrocarbon groups with 10 or more and 22 or less carbons and polyoxyalkylene groups with average numbers of added moles of preferably 9 or more and 5000 or less. The polyether compounds are preferable components from the viewpoint of developing a favorable rheology modifying effect even in the case where the object to which the rheology modifying agent of the present invention is applied, for example, a hydraulic slurry composition, includes aggregates containing bentonites or clay minerals.

The weight average molecular weights of the polyether compounds are values measured by gel permeation chromatography (GPC) using polystyrene as a standard, and in the case where the polyether compound is a polyethylene glycol, water/ethanol can be used as a solvent.

More preferable polyether compounds are one or more polymers selected from polyethylene glycols with weight average molecular weights of 500 or more and 200000 or less as practically sufficient viscoelasticity is obtained over a wide range of molecular weights.

When the rheology modifying agent of the present invention contains water and a polyether compound, the content of the polyether compound is preferably 5 parts by mass or more, more preferably 7.5 parts by mass or more and further preferably 10 parts by mass or more, and preferably 70 parts by mass or less, more preferably 60 parts by mass or less and further preferably 50 parts by mass or less relative to 100 parts by mass of water from the viewpoint of obtaining practically sufficient viscoelasticity.

The rheology modifying agent of the present invention can contain a dispersant. A dispersant is a preferable component from the viewpoint of developing a favorable rheology modifying effect and fluidity when the object to which the rheology modifying agent of the present invention is applied is a hydraulic slurry composition.

Exemplary dispersants are a naphthalene-based polymer, a polycarboxylic acid-based polymer, a melamine-based polymer, a phenol-based polymer and a lignin-based polymer.

More specifically, exemplary dispersants are one or more dispersants selected from (E1) a naphthalene-based dispersant, (E2) a polycarboxylic acid-based dispersant, (E3) a dispersant composed of the following polycondensation product (hereinafter, also referred to as a PAE-based dispersant), (E4) a lignin-based dispersant and (E5) a melamine-based dispersant.

<Polycondensation Product>

A polycondensation product composed of the following components E31, E33, and optionally, E32.

[Component E31]

An aromatic compound or heteroaromatic compound having 5 to 10 carbon atoms or hetero atoms including, on average, 1 to 300 oxyethylene and/or oxypropylene groups per molecule bonded to the aromatic compound or heteroaromatic compound via O atoms or N atoms.

[Component E32]

At least one aromatic compound as an optional component selected from the group consisting of: (E32-1) phenol; (E32-2) phenol ether; (E32-3) naphthol; (E32-4) naphthol ether; (E32-5) aniline; (E32-6) furfuryl alcohol; and (E32-7) an aminoplast-forming agent selected from the group consisting of melamine or derivatives thereof, urea or derivatives thereof and carboxamide, hydroxybenzoic acid, benzoic acid, isophthalic acid and oxynaphthoic acid.

[Component E33]

An aldehyde selected from the group consisting of formaldehyde, glyoxylic acid and benzaldehyde or mixtures thereof (here, the benzaldehyde may further have acidic groups represented by the formulas of $COOM_a$, $SO_3M_a$ and $PO_3M_a$ (M is H, an alkali metal or an alkaline earth metal, ammonium, or an organic amine group, and a may be ½, 1 or 2)).

One or more dispersants selected from (E1) a naphthalene-based dispersant, (E2) a polycarboxylic acid-based dispersant and (E4) a lignin-based dispersant are preferable, one or more selected from (E1) a naphthalene-based dispersant and (E2) a polycarboxylic acid-based dispersant are more preferable, and (E2) a polycarboxylic acid-based dispersant is further preferable from the viewpoint of the fluidity of hydraulic slurry compositions. Hereinafter, the dispersants are explained.

(E1) Naphthalene-Based Dispersant

A preferable naphthalene-based dispersant is, by way of example, a naphthalene sulfonic acid formaldehyde condensate or a salt thereof. The naphthalene sulfonic acid formaldehyde condensate or a salt thereof is a condensate of a naphthalene sulfonic acid and a formaldehyde or a salt thereof. The naphthalene sulfonic acid formaldehyde condensate may be used by co-condensing as a monomer with an aromatic compound capable of being co-condensed with a naphthalene sulfonic acid, such as, for example, methyl naphthalene, ethyl naphthalene, butyl naphthalene, hydroxy naphthalene, naphthalene carboxylic acid, anthracene, phenol, cresol, creosote oil, tar, melamine, urea, sulfanilic acid and/or derivatives thereof or the like unless the performance is impaired.

A commercially available product, such as, for example, MIGHTY 150, DEMOL N, DEMOL RN, DEMOL MS, DEMOL 3N-B, DEMOL SS-L (all manufactured by Kao Corporation), CELLFLOW 120, LAVELIN FD-40, LAVELIN FM-45 (all manufactured by DKS Co. Ltd.) or the like can be used as a naphthalene sulfonic acid formaldehyde condensate or a salt thereof.

The weight average molecular weight of the naphthalene sulfonic acid formaldehyde condensate or a salt thereof is preferably 200,000 or less, more preferably 100,000 or less, further preferably 80,000 or less, furthermore preferably 50,000 or less and furthermore preferably 30,000 or less from the viewpoint of improving the fluidity of hydraulic slurry compositions. In addition, the weight average molecular weight of the naphthalene sulfonic acid formaldehyde condensate or a salt thereof is preferably 1,000 or more, more preferably 3,000 or more, further preferably 4,000 or more and furthermore preferably 5,000 or more from the viewpoint of improving the fluidity of hydraulic slurry compositions. The naphthalene sulfonic acid formaldehyde condensate may be in an acid state or a neutralized product.

The molecular weight of the naphthalene sulfonic acid formaldehyde condensate or a salt thereof can be measured with gel permeation chromatography under the following conditions.

[GPC Conditions]
Column: G4000SWXL+G2000SWXL (Tosoh Corporation)
Eluent: 30 mM $CH_3COONa/CH_3CN$=6/4
Flow rate: 0.7 ml/min
Detection: UV 280 nm
Sample size: 0.2 mg/ml
Standard substance: expressed in terms of a polystyrene sulfonate soda manufactured by Nishio Kogyo Co., Ltd. (monodisperse sodium polystyrene sulfonate: molecular weight, 206, 1,800, 4,000, 8,000, 18,000, 35,000, 88,000, 780,000)
Detector: Tosoh Corporation UV-8020

(E2) Polycarboxylic Acid-Based Dispersant

As a polycarboxylic acid-based dispersant, a copolymer of a monoester of polyalkylene glycol and (meth)acrylic acid and a carboxylic acid such as (meth)acrylic acid or the like (e.g., compounds described in JP-A H3-12397 and the like), a copolymer of an unsaturated alcohol having polyalkylene glycol and a carboxylic acid such as (meth)acrylic acid or the like or a copolymer of an unsaturated alcohol having polyalkylene glycol and a dicarboxylic acid such as maleic acid or the like, etc. can be used. Here, the (meth) acrylic acid means a carboxylic acid selected from acrylic acid and methacrylic acid.

From the viewpoint of initial fluidity, a preferable polycarboxylic acid-based dispersant is a copolymer including monomer (e21) represented by the following general formula (e21) as a constituent monomer.

The polycarboxylic acid-based dispersant is more preferably a copolymer including monomer (e21) represented by the following general formula (e21) and monomer (e22) represented by the following general formula (e22) as constituent monomers.

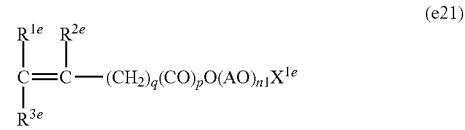
(e21)

wherein
$R^{1e}$ and $R^{2e}$ may be the same or different and each hydrogen atoms or methyl groups;
$R^{3e}$ is a hydrogen atom or —COO $(AO)_{n1}X^{1e}$;
$X^{1e}$ is a hydrogen atom or an alkyl group with 1 or more and 4 or less carbons;
AO is a group selected from an ethyleneoxy group and a propyleneoxy group;
n1 is an average number of added moles of AO and a number of 1 or more and 300 or less;
q is a number of 0 or more and 2 or less; and
p is a number of 0 or 1.

(e22)

wherein
$R^{4e}$, $R^{5e}$ and $R^{6e}$ may be the same or different and each hydrogen atoms, methyl groups or $(CH_2)_rCOOM^{2e}$, and $(CH_2)_rCOOM^{2e}$ may form an anhydride with $COOM^{1e}$ or another $(CH_2)_rCOOM^{2e}$, and in that case, there is no $M^{1e}$ or $M^{2e}$ in those groups;
$M^{1e}$ and $M^{2e}$ may be the same or different and each hydrogen atoms, alkali metals, alkaline earth metals (½ atom), ammonium groups, alkyl ammonium groups, substituted alkyl ammonium groups, alkyl groups, hydroxyalkyl groups or alkenyl groups; and
r is a number of 0 or more and 2 or less.

Two or more types of dispersants which differ in average number of added moles of AO, proportion between monomer (e21) and monomer (e22) or the like can also be used as polycarboxylic acid-based dispersants.

An exemplary preferable PAE-based dispersant is a dispersant composed of a polycondensation product composed of the following components E31, E32 and E33, wherein a molar ratio of component E33:(component E31+component E32) is 1:0.01 to 1:10, and a molar ratio of component E31:component E32 is 10:1 to 1:10.

[Component E31]

A compound in which, on average, 1 to 300 oxyethylene groups and/or oxypropylene groups per molecule are bonded to an aromatic compound selected from the group consisting of phenol, cresol, resorcinol, nonylphenol, methoxyphenol, naphthol, methylnaphthol, butylnaphthol and bisphenol A via O atoms or N atoms

[Component E32]

At least one aromatic compound selected from the group consisting of phenoxyacetic acid, phenoxyethanol, phenoxyethanol phosphate, phenoxydiglycol and phenoxy(poly)ethylene glycol phosphate, hydroxybenzoic acid, benzoic acid, isophthalic acid and oxynaphthoic acid

[Component E33]

An aldehyde selected from the group consisting of formaldehyde, glyoxylic acid and benzaldehyde or mixtures thereof (here, the benzaldehyde may further have an acidic group represented by the formula of COOMa, $SO_3$Ma or $PO_3$Ma (M is H, an alkali metal or an alkaline earth metal, ammonium, or an organic amine group, and a may be ½, 1 or 2))

When the rheology modifying agent of the present invention contains water and a dispersant, the content of the dispersant is preferably 5 parts by mass or more, more preferably 8 parts by mass or more and further preferably 10 parts by mass or more, and preferably 200 parts by mass or less, more preferably 100 parts by mass or less and further preferably 80 parts by mass or less relative to 100 parts by mass of water from the viewpoint of obtaining practically sufficient fluidity of hydraulic slurry compositions and favorable long-term storage stability of admixtures for hydraulic slurry compositions.

In the rheology modifying agent of the present invention, a mass ratio of the total content of compound (1) to the content of a dispersant, compound (1)/dispersant, is preferably 3/97 or more, more preferably 5/95 or more and further preferably 10/90 or more, and preferably 97/3 or less, more preferably 95/5 or less and 90/10 or less from the viewpoints of favorable viscoelasticity of hydraulic slurries and long-term storage stability of admixtures for hydraulic slurry compositions.

The rheology modifying agent of the present invention can contain an anionic aromatic compound from the viewpoint of developing a more favorable rheology modifying effect over a wide temperature region. Exemplary anionic aromatic compounds are one or more compounds selected from a sulfonic acid with an aromatic ring, a carboxylic acid with an aromatic ring, a phosphonic acid with an aromatic ring or salts thereof. An anionic aromatic compound with 6 or more and 12 or less carbons in total as an acid-type compound is preferable. Specifically, exemplary anionic aromatic compounds are salicylic acid, p-toluenesulfonic acid, sulfosalicylic acid, benzoic acid, m-sulfobenzoic acid, p-sulfobenzoic acid, 4-sulfophthalic acid, 5-sulfoisophthalic acid, p-phenol sulfonic acid, m-xylene-4-sulfonic acid, cumensulfonic acid, methyisalicylic acid, styrenesulfonic acid, chlorobenzoic acid and the like. They may form salts. Two or more types of anionic aromatic compounds may be used. One or more anionic aromatic compounds selected from a sulfonic acid with an aromatic ring, a carboxylic acid with an aromatic ring or salts thereof are preferable.

In the rheology modifying agent of the present invention, a mass ratio of the total content of compound (1) to the content of an anionic aromatic compound, compound (1)/anionic aromatic compound, is preferably 50/50 or more, more preferably 70/30 or more and further preferably 80/20 or more, and preferably 99.9/0.1 or less and more preferably 95/5 or less from the viewpoint of favorable viscoelasticity of hydraulic slurries.

The present invention provides use, as a rheology modifying agent, of a mixture containing two or more types of compounds represented by the general formula (1), wherein the two or more types of compounds differ in X in the general formula (1) and at least one of the two or more types of compounds is a compound in which $R^{1a}$ or $R^{1b}$ of X in the general formula (1) is an alkenyl group.

In addition, the present invention provides use, as a rheology modifying agent, of a mixture containing two or more types of compounds represented by the general formula (1) and water, wherein the two or more types of compounds differ in X in the general formula (1) and at least one of the two or more types of compounds is a compound in which $R^{1a}$ or $R^{1b}$ of X in the general formula (1) is an alkenyl group.

Moreover, the present invention provides use, as a rheology modifying agent, of a mixture containing two or more types of compounds represented by the general formula (1), a polyether compound and water, wherein the two or more types of compounds differ in X in the general formula (1) and at least one of the two or more types of compounds is a compound in which $R^{1a}$ or $R^{1b}$ of X in the general formula (1) is an alkenyl group.

Further, the present invention provides use, as a rheology modifying agent, of a mixture containing two or more types of compounds represented by the general formula (1), a polyether compound, a dispersant and water, wherein the two or more types of compounds differ in X in the general formula (1) and at least one of the two or more types of compounds is a compound in which $R^{1a}$ or $R^{1b}$ of X in the general formula (1) is an alkenyl group.

Furthermore, the present invention provides application of the above mixtures for use in the rheology modification of slurries.

Furthermore, the present invention provides a method for modifying the rheology of slurries with the above mixtures.

The aforementioned matters, for example, the preferable modes of a compound represented by the general formula (1), the polyether compounds and the dispersants can be appropriately applied to the use as a rheology modifying agent, the application for use in the rheology modification of slurries and the method for modifying the rheology of slurries of the present invention.

The aspects mentioned in the rheology modifying agent of the present invention can be appropriately applied to the use as a rheology modifying agent, the application for use in the rheology modification of slurries and the method for modifying the rheology of slurries of the present invention.

<Slurry Composition>

A slurry composition of the present invention contains the rheology modifying agent of the present invention, water and a powder.

The slurry composition of the present invention may be a slurry composition containing two or more types of compounds represented by the general formula (1) [hereinafter, also referred to as compound (1)], water and a powder, wherein the two or more types of compounds differ in X in the general formula (1) and at least one of the two or more types of compounds is a compound in which $R^{1a}$ or $R^{1b}$ of X in the general formula (1) is an alkenyl group.

The matters mentioned in the rheology modifying agent of the present invention can be appropriately applied to the slurry composition of the present invention.

Examples of the powder include inorganic powders. Exemplary inorganic powders include, but are not particularly limited to, those shown below. Slurry compositions using hydraulic powders among inorganic powders are hydraulic slurry compositions. Powders including hydraulic powders are preferable.

(1) hydraulic powders, such as cement, gypsum and the like
(2) powders with pozzolanic properties, such as fly ash, silica fume, volcanic ash, clay silicate and the like
(3) latent hydraulic powders, such as coal ash, blast furnace slag, diatomaceous earth and the like
(4) silicates, such as kaolin, aluminum silicate, clay, talc, mica, calcium silicate, sericite, bentonite and the like
(5) carbonates, such as calcium carbonate, magnesium carbonate, barium carbonate, basic lead carbonate and the like
(6) sulfates, such as calcium sulfate, barium sulfate and the like
(7) chromates, such as strontium chromate, pigment yellow and the like
(8) molybdates, such as zinc molybdate, calcium zinc molybdate, magnesium molybdate and the like
(9) metal oxides, such as alumina, antimony oxide, titanium oxide, cobalt oxide, triiron tetraoxide, diiron trioxide, trilead tetraoxide, lead monoxide, chrome oxide green, tungsten trioxide, yttrium oxide and the like
(10) metal hydroxides, such as aluminum hydroxide, magnesium hydroxide, calcium hydroxide, iron hydroxide, metatitanic acid and the like
(11) metal carbides, such as silicon carbide, tungsten carbide, boron carbide, titanium carbide and the like
(12) other inorganic powders not classified into (1) through (11) above, such as aluminum nitride, silicon nitride, boron nitride, zirconia, barium titanate, satin white, carbon black, graphite, chrome yellow, mercury sulfide, ultramarine, paris blue, titanium yellow, chrome vermillion, lithopone, copper acetoarsenite, nickel, silver, palladium, lead zirconate titanate and the like An exemplary powder is a hydraulic powder or a mixture of a hydraulic powder and bentonite. In addition, an exemplary powder is cement or a mixed powder of cement and bentonite.

In the slurry composition of the present invention, the total content of compound (1) is preferably 0.5 parts by mass or more, more preferably 1 part by mass or more, further preferably 2 parts by mass or more and furthermore preferably 3 parts by mass or more, and preferably 30 parts by mass or less, more preferably 10 parts by mass or less, further preferably 8 parts by mass or less, furthermore preferably 6 parts by mass or less and furthermore preferably 5 parts by mass or less relative to 100 parts by mass of water from the viewpoint of obtaining practically sufficient viscoelasticity. Here, the water is water of a water phase portion of the slurry composition.

In addition, when the slurry composition of the present invention contains the aforementioned compounds (1a) and (1b), the content of compound (1a) relative to 100 parts by mass of water is preferably 0.25 parts by mass or more, more preferably 0.5 parts by mass or more and further preferably 1 part by mass or more from the viewpoint of obtaining high viscoelasticity over a wide range of temperatures, and preferably 5 parts by mass or less, more preferably 4 parts by mass or less and further preferably 3 parts by mass or less from the viewpoint of handleability. Here, the water is water of a water phase portion of the slurry composition.

Moreover, when the slurry composition of the present invention contains the aforementioned compounds (1a) and (1b), the content of compound (1b) relative to 100 parts by mass of water is preferably 0.25 parts by mass or more, more preferably 0.5 parts by mass or more and further preferably 1 part by mass or more from the viewpoint of obtaining high viscoelasticity over a wide range of temperatures, and preferably 5 parts by mass or less, more preferably 4 parts by mass or less and further preferably 3 parts by mass or less from the viewpoint of handleability. Here, the water is water of a water phase portion of the slurry composition.

It is preferable that, in the slurry composition of the present invention, the total content of compounds (1a) and (1b) be within the predetermined range and each content of compounds (1a) and (1b) be within the predetermined range.

The slurry composition of the present invention can contain the aforementioned anionic aromatic compounds. In this case, a mass ratio of compound (1)/anionic aromatic compound is preferably also within the aforementioned range. In addition, the content of an anionic aromatic compound is preferably 0.01 parts by mass or more and more preferably 0.05 parts by mass or more, and preferably 10 parts by mass or less, more preferably 5 parts by mass or less, more preferably 2.5 parts by mass or less, more preferably 1 part by mass or less, more preferably 0.8 parts by mass or less, more preferably 0.5 parts by mass or less and more preferably 0.25 parts by mass or less relative to 100 parts by mass of water of the slurry composition. Here, the water is water of a water phase portion of the slurry composition.

In the slurry composition of the present invention, a water/powder ratio (W/P) is preferably 12 mass % or more, more preferably 30 mass % or more, further preferably 50 mass % or more, furthermore preferably 100 mass % or more and furthermore preferably 150 mass % or more from the viewpoint of ensuring the fluidity of the slurry composition, and preferably 1000 mass % or less, more preferably 500 mass % or less and further preferably 300 mass % or less from the viewpoint of suppressing the shrinkage of the slurry composition due to drying.

Here, the water/powder ratio (W/P) is a mass percentage (mass %) of water to a powder in the slurry composition and calculated by water/powder×100.

[Hydraulic Slurry Composition]

Examples of the slurry composition of the present invention include a hydraulic slurry composition. Hereinafter, the hydraulic slurry composition is explained.

The present invention provides a hydraulic slurry composition containing the rheology modifying agent of the present invention, water and a hydraulic powder. That is, the hydraulic slurry composition of the present invention contains two or more types of compounds (1) satisfying any of the aforementioned predetermined relations, water and a hydraulic powder.

The matters mentioned in the rheology modifying agent and slurry composition of the present invention can be appropriately applied to the hydraulic slurry composition of the present invention.

A hydraulic powder used in the hydraulic slurry composition of the present invention is a powder that hardens when mixed with water, and examples thereof include, for example, normal Portland cement, high-early-strength Portland cement, ultra-high-early-strength Portland cement, sulfate-resistant Portland cement, low-heat Portland cement, white Portland cement and eco-cement (e.g., JIS R5214 and the like). Among them, from the viewpoint of reducing the time required for the hydraulic slurry composition to reach a required strength, cement selected from high-early-strength Portland cement, normal Portland cement, sulfate-resistant Portland cement and white Portland cement is preferable, and cement selected from high-early-strength Portland cement and normal Portland cement is more preferable.

In addition, the hydraulic powder may include blast furnace slag, fly ash, silica fume, anhydrous gypsum and the like, and may also include a non-hydraulic limestone fine powder and the like. Blast furnace cement, fly ash cement or silica fume cement, which is a mixture of cement and blast furnace slag, fly ash, silica fume or the like, may be used as a hydraulic powder. In addition, it may also include a clay such as bentonite or the like. If the hydraulic slurry composition of the present invention includes a clay, it preferably contains any of the predetermined polyether compounds mentioned above.

The hydraulic slurry composition of the present invention preferably contains an aggregate. Exemplary aggregates are a fine aggregate, a coarse aggregate and the like, and preferable fine aggregates are mountain sand, land sand, river sand and crushed sand, and preferable coarse aggregates are mountain gravel, land gravel, river gravel and crushed stone. Depending on the application, lightweight aggregates may also be used. Note that the terms for the aggregates are based on "Concrete Handbook" (Jun. 10, 1998, published by Gijutsu Shoin Company, Limited).

The hydraulic slurry composition can also contain another component other than compound (1) in such a range as not to affect the effect of the present invention. Examples thereof include, for example, the aforementioned dispersants, the aforementioned polyether compounds, the aforementioned anionic aromatic compounds, AE agents, retardants, foaming agents, thickeners, blowing agents, waterproofing agents, fluidizing agents, defoaming agents and the like.

In the hydraulic slurry composition of the present invention, the total content of compound (1) relative to 100 parts by mass of water is preferably 0.5 parts by mass or more, more preferably 1 part by mass or more, further preferably 2 parts by mass or more and furthermore preferably 3 parts by mass or more from the viewpoint of obtaining practically sufficient viscoelasticity, and preferably 30 parts by mass or less, more preferably 10 parts by mass or less, further preferably 8 parts by mass or less, furthermore preferably 6 parts by mass or less and furthermore preferably 5 parts by mass or less from the viewpoint of not inhibiting a hydration reaction of the hydraulic slurry composition. Here, the water is water of a water phase portion of the hydraulic slurry composition.

In addition, when the hydraulic slurry composition of the present invention contains the aforementioned compounds (1a) and (1b), the content of compound (1a) relative to 100 parts by mass of water is preferably 0.25 parts by mass or more, more preferably 0.5 parts by mass or more and further preferably 1 part by mass or more from the viewpoint of obtaining high viscoelasticity over a wide range of temperatures, and preferably 5 parts by mass or less, more preferably 4 parts by mass or less and further preferably 3 parts by mass or less from the viewpoint of handleability. Here, the water is water of a water phase portion of the hydraulic slurry composition.

Moreover, when the hydraulic slurry composition of the present invention contains the aforementioned compounds (1a) and (1b), the content of compound (1b) relative to 100 parts by mass of water is preferably 0.25 parts by mass or more, more preferably 0.5 parts by mass or more and further preferably 1 part by mass or more from the viewpoint of obtaining high viscoelasticity over a wide range of temperatures, and preferably 5 parts by mass or less, more preferably 4 parts by mass or less and further preferably 3 parts by mass or less from the viewpoint of handleability. Here, the water is water of a water phase portion of the hydraulic slurry composition.

It is preferable that, in the hydraulic slurry composition of the present invention, the total content of compounds (1a) and (1b) (i.e., the content of compound (1)) be within the predetermined range and each content of compounds (1a) and (1b) be within the predetermined range.

When the hydraulic slurry composition of the present invention contains the aforementioned compounds (1a) and (1b), a mass ratio of compound (1b)/compound (1a) is preferably 5/95 or more, more preferably 25/75 or more and further preferably 40/60 or more, and preferably 95/5 or less, more preferably 75/25 or less and further preferably 60/40 or less from the viewpoint of obtaining a rheology modifying effect, for example, high viscoelasticity, over a wider temperature region.

In the hydraulic slurry composition of the present invention, a water/hydraulic powder ratio (W/P) is preferably 12 mass % or more, more preferably 30 mass % or more, further preferably 40 mass % or more and furthermore preferably 50 mass % or more from the viewpoint of ensuring the fluidity of the hydraulic slurry composition, and preferably 500 mass % or less, more preferably 400 mass % or less and further preferably 300 mass % or less from the viewpoint of ensuring the hydraulicity of the hydraulic slurry composition.

Here, the water/hydraulic powder ratio (W/P) is a mass percentage (mass %) of water to a hydraulic powder in the hydraulic slurry composition and calculated by water/hydraulic powder×100. The water/hydraulic powder ratio is calculated on the basis of the amount of a powder with the physical property of hardening by a hydration reaction. In addition, W/P may be expressed by W/C when a hydraulic powder is cement.

Note that, when the hydraulic powder includes, in addition to a powder with the physical property of hardening by a hydration reaction such as cement or the like, a powder selected from a powder with pozzolanic properties, a powder with latent hydraulic properties and stone dust (calcium carbonate powder), the amount thereof is also included in the amount of the hydraulic powder in the present invention. In addition, when the powder with the physical property of hardening by a hydration reaction contains a high strength admixture material, the amount of the high strength admixture material is also included in the amount of the hydraulic powder. The same applies to other parts by mass and the like to which the mass of the hydraulic powder is related.

When the hydraulic slurry composition of the present invention contains any of the aforementioned polyether compounds, the content of the polyether compound relative to 100 parts by mass of water in the hydraulic slurry composition of the present invention is preferably 0.15 parts by mass or more, more preferably 0.25 parts by mass or more, further preferably 0.35 parts by mass or more, furthermore preferably 0.45 parts by mass or more and furthermore preferably 0.5 parts by mass or more from the viewpoint of obtaining practically sufficient viscoelasticity, and preferably 5 parts by mass or less, more preferably 4 parts by mass or less, further preferably 3 parts by mass or less, furthermore preferably 2 parts by mass or less, furthermore preferably 1.5 parts by mass or less and furthermore preferably 1 part by mass or less from the viewpoint of suppressing the thickening of the hydraulic slurry composition. Here, the water is water of a water phase portion of the hydraulic slurry composition.

When the hydraulic slurry composition of the present invention contains any of the aforementioned dispersants, the content of the dispersant relative to 100 parts by mass of the hydraulic powder is preferably 0.06 parts by mass or more, more preferably 0.09 parts by mass or more and further preferably 0.12 parts by mass or more from the viewpoint of obtaining practically sufficient fluidity, and preferably 1.0 parts by mass or less, more preferably 0.8 parts by mass or less and further preferably 0.6 parts by mass or less from the viewpoint of not inhibiting a hydration reaction of the hydraulic slurry composition.

The hydraulic slurry composition of the present invention can contain any of the aforementioned anionic aromatic compounds. In this case, a mass ratio of compound (1)/anionic aromatic compound is preferably also within the aforementioned range. In addition, the content of the anionic aromatic compound is preferably 0.01 parts by mass or more and more preferably 0.05 parts by mass or more, and preferably 10 parts by mass or less, more preferably 5 parts by mass or less, more preferably 2.5 parts by mass or less, more preferably 1 part by mass or less, more preferably 0.8 parts by mass or less, more preferably 0.5 parts by mass or less and more preferably 0.25 parts by mass or less relative to 100 parts by mass of water of the hydraulic slurry composition. Here, the water is water of a water phase portion of the hydraulic slurry composition.

<Method for Producing Slurry Composition>

A method for producing a slurry composition of the present invention is a method for producing a slurry composition including mixing the rheology modifying agent of the present invention, water and a powder. p The matters mentioned in the rheology modifying agent and slurry composition of the present invention can be appropriately applied to the method for producing a slurry composition of the present invention.

In the method for producing a slurry composition of the present invention, it is preferable that slurry-including water and a powder be prepared in advance and the rheology modifying agent of the present invention be added to the slurry and mixed to produce the slurry composition.

In addition, two or more types of compounds (1) as components of the rheology modifying agent of the present invention, for example, compounds (1a) and (1b), may be separately added. In this case, it is preferable that slurry including water and a powder be prepared in advance and compound (1a) be added to the slurry and mixed, and thereafter, compound (1b) be added and mixed to produce the slurry composition.

Examples of the powder include a hydraulic powder or a mixture of a hydraulic powder and bentonite. In addition, examples of the powder include cement or a mixed powder of cement and bentonite. The powder preferably includes a hydraulic powder.

The slurry composition and a slurry composition obtained by the method for producing a slurry composition of the present invention modify the rheology of slurries over a wide temperature region. The slurry composition and the method for producing a slurry composition of the present invention are useful as, for example, a hydraulic slurry composition and a method for producing a hydraulic slurry composition.

The slurry composition of the present invention is considered to be excellent in material separation resistance since it has viscosity, elasticity or viscoelasticity. When it has high viscoelasticity, it is considered to be more likely to suppress the precipitation of slurry particles.

EXAMPLES

The followings were used as compounds (1a) and (1b) shown in tables.

<Compound (1a)>
Compound (1a-1): oleyl dimethyl amine oxide (in the general formula (1a), $R^{11a}$: an alkenyl group with 18 carbons (an oleyl group), n1: 0, $R^2$: a methyl group, $R^3$: a methyl group)

Compound (1a-2): oleic acid amido propyl dimethyl amine oxide (in the general formula (1a), $R^{11a}$: an alkenyl group with 17 carbons, n1: 1, $R^2$: a methyl group, $R^3$: a methyl group) (for some examples, it is shown in a column of compound (1b) in a table)

<Compound (1b)>
Compound (1b-1): stearyl dimethyl amine oxide (in the general formula (1b), $R^{11b}$: an alkyl group with 18 carbons (a stearyl group), n2: 0, $R^2$: a methyl group, $R^3$: a methyl group)

Compound (1b-2): palmityl dimethyl amine oxide (in the general formula (1b), $R^{11b}$: an alkyl group with 16 carbons (a palmityl group), n2: 0, $R^2$: a methyl group, $R^3$: a methyl group)

Compound (1b-3): lauryl dimethyl amine oxide (in the general formula (1b), $R^{11b}$: an alkyl group with 12 carbons (a lauryl group), n2: 0, $R^2$: a methyl group, $R^3$: a methyl group)

Each of compounds (1a) and (1b) can be produced, for example, by a method described in JP-A 2001-213859. In the present examples, compounds (1a) and (1b) were produced by oxidizing their respective corresponding alkyl dimethyl amines, alkenyl dimethyl amines or alkenyl amido propyl amines.

<Preparation of Hydraulic Slurry Composition>

400 g of water adjusted to predetermined temperatures shown in the tables and 400 g of cement (a mixture of normal Portland cements manufactured by TAIHEIYO CEMENT CORPORATION and Sumitomo Osaka Cement Co., Ltd. at a mass ratio of 50/50) were mixed, and stirred for 30 seconds using a commercially available hand mixer; and then, compounds (1a) and (1b) shown in the tables were added thereto as rheology modifying agents, and anionic aromatic compounds shown in a table were added thereto as necessary; and after adding the rheology modifying agents, stirring was continued for 3 minutes (5 minutes when water at 10° C. was used), thereby preparing hydraulic slurry compositions.

The preparation was performed such that the amount of water first added to the cement and the amount of water in each composition was 400 g in total.

Note that the added amount of the rheology modifying agents [total added amount of compounds (1a) and (1b)] relative to 100 parts by mass of water and the mass ratio of compound (1b)/compound (1a) were as shown in the tables.

In addition, a water/hydraulic powder ratio (W/P) in each hydraulic slurry composition was 100 mass %.

<Measurement of Slurry Viscosity>

The viscosity of the resultant hydraulic slurry compositions was measured by a B-type viscometer (manufactured by RION Co., Ltd., VISCOTESTER VT-04E, rotor No. 1, revolution speed: 62.5 rpm). The measurement was performed at each temperature shown in the tables. In this evaluation, the viscosity is preferably 300 mPa·s or more. The results are shown in the tables.

In addition, spinnability and a rewinding phenomenon were checked for hydraulic slurry compositions in the examples to check the viscoelasticity. The spinnability and rewinding phenomenon were observed in any of the hydraulic slurries of the examples and it was able to be checked that they had viscoelasticity. Here, the spinnability of each hydraulic slurry was judged by vertically erecting a smooth-surfaced glass rod with a diameter of 6 mm at the center of the bottom of a beaker, pulling out the glass rod from that state within about 1 second, and visually observing a spinning state at the tip of the glass rod at the moment. The rewinding phenomenon means that aggregates in a hydraulic slurry become entangled with one another to have elastic properties, and refers to the state in which air bubbles entrained in the hydraulic slurry move in the opposite direction of a rotating direction when the stirring is stopped. In any of the examples, this state was observed. Note that, for hydraulic slurry compositions of comparative examples whose viscosity is shown as 0 mPa·s in a table, neither the spinnability nor the rewinding phenomenon was observed.

TABLE 1

|  |  | Rheology modifying agent | | | | Viscosity of hydraulic slurry | |
| --- | --- | --- | --- | --- | --- | --- | --- |
|  |  | Compound (1a) Type | Compound (1b) Type | Compound (1b)/ compound (1a) (mass ratio) | Added amount (parts by mass) | Temperature (° C.) | Viscosity (mPa · s) |
| Example | 1 | (1a-1) | (1b-1) | 70/30 | 1.2 | 10 | 2100 |
|  |  |  |  |  |  | 20 | 7000 |
|  |  |  |  |  |  | 30 | 10000 |
|  | 2 |  |  | 60/40 |  | 10 | 2700 |
|  |  |  |  |  |  | 20 | 8500 |
|  |  |  |  |  |  | 30 | 9500 |
|  | 3 |  |  | 50/50 |  | 10 | 4500 |
|  |  |  |  |  |  | 20 | 9000 |
|  |  |  |  |  |  | 30 | 7000 |
|  | 4 |  |  | 40/60 |  | 10 | 6500 |
|  |  |  |  |  |  | 20 | 9000 |
|  |  |  |  |  |  | 30 | 3000 |
|  | 5 |  |  | 30/70 |  | 10 | 6000 |
|  |  |  |  |  |  | 20 | 8000 |
|  |  |  |  |  |  | 30 | 2000 |
|  | 6 | (1a-1) | (1b-2) | 75/25 |  | 10 | 1500 |
|  |  |  |  |  |  | 20 | 2000 |
|  |  |  |  |  |  | 30 | 1500 |
|  | 7 |  |  | 50/50 |  | 10 | 1800 |
|  |  |  |  |  |  | 20 | 2300 |
|  |  |  |  |  |  | 30 | 1800 |
|  | 8 |  |  | 25/75 |  | 10 | 4500 |
|  |  |  |  |  |  | 20 | 2000 |
|  |  |  |  |  |  | 30 | 1400 |
|  | 9 | (1a-1) | (1a-2) | 75/25 |  | 10 | 3000 |
|  |  |  |  |  |  | 20 | 8000 |
|  |  |  |  |  |  | 30 | 8000 |
|  | 10 |  |  | 50/50 |  | 10 | 4500 |
|  |  |  |  |  |  | 20 | 1900 |
|  |  |  |  |  |  | 30 | 1000 |
|  | 11 |  |  | 25/75 |  | 10 | 8000 |
|  |  |  |  |  |  | 20 | 8000 |
|  |  |  |  |  |  | 30 | 1000 |
|  | 12 | (1a-2) | (1b-1) | 50/50 |  | 10 | 1600 |
|  |  |  |  |  |  | 20 | 2500 |
|  |  |  |  |  |  | 30 | 4000 |
| Comparative example | 1 | — | (1b-1) | — |  | 10 | 0 |
|  |  |  |  |  |  | 20 | 0 |
|  |  |  |  |  |  | 30 | 0 |
|  | 2 | — | (1b-2) | — |  | 10 | 0 |
|  |  |  |  |  |  | 20 | 0 |
|  |  |  |  |  |  | 30 | 0 |
|  | 3 | (1a-1) | — | 0/100 |  | 10 | 6000 |
|  |  |  |  |  |  | 20 | 1500 |
|  |  |  |  |  |  | 30 | 0 |
|  | 4 | (1a-1) | (1b-3) | 50/50 |  | 10 | 0 |
|  |  |  |  |  |  | 20 | 0 |
|  |  |  |  |  |  | 30 | 0 |

TABLE 2

| | | Rheology modifying agent | | | | | Viscosity of hydraulic slurry | |
| | | Compound (1) | | | Anionic aromatic compound | | | |
| | | Compound (1a) Type | Compound (1b) Type | Compound (1b)/ compound (1a) (mass ratio) | Added amount (parts by mass) | Type | Added amount (parts by mass) | Temperature (° C.) | Viscosity (mPa · s) |
|---|---|---|---|---|---|---|---|---|---|
| Example | 13 | (1a-1) | (1b-1) | 50/50 | 1.2 | p-toluenesulfonic acid Na | 0.08 | 10 | 6000 |
| | | | | | | | | 20 | 10000 |
| | | | | | | | | 30 | 7000 |
| | 14 | | | | | Salicylic acid | 0.07 | 10 | 6500 |
| | | | | | | | | 20 | 10000 |
| | | | | | | | | 30 | 8000 |

In the tables, the added amount of the rheology modifying agents is parts by mass relative to 100 parts by mass of water in each hydraulic slurry.

It is evident from the results in the tables that, in the examples, the hydraulic slurries are high in viscosity and develop viscoelasticity at any temperature of 10° C. to 30° C. On the other hand, it can be seen that, in the comparative examples, thickening cannot be achieved and viscoelasticity cannot be imparted in this temperature region, or viscoelasticity can be only imparted in a narrow temperature region.

The invention claimed is:

1. A rheology modifying agent comprising two or more types of compounds,
   wherein the two or more types of compounds comprise a compound (1a) represented by the following general formula (1a) and a compound (1b) represented by the following general formula (1b):

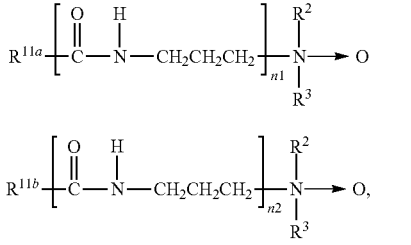

wherein:
   each of n1 and n2 is independently an integer of 0 or more and 3 or less;
   $R^{11a}$ is an alkenyl group with 14 or more and 22 or less carbons when n1 is 0 and an alkenyl group with 13 or more and 21 or less carbons when n1 is 1 to 3;
   $R^{11b}$ is an alkenyl group with 14 or more and 22 or less carbons when n2 is 0 and an alkenyl group with 13 or more and 21 or less carbons when n2 is 1 to 3;
   provided that an alkenyl group of $R^{11b}$ is an alkenyl group which is different from $R^{11a}$ when n1 and n2 are the same number;
   each of $R^2$ and $R^3$ is independently an alkyl group with 1 or more and 4 or less carbons or a group represented by —$(C_2H_4O)_pH$; and
   p is an average number of added moles of $(C_2H_4O)$ and a total for $R^2$ and $R^3$ is a number of 0 or more and 5 or less, and
   wherein a mass ratio of compound (1b)/compound (1a) is 5/95-40/60.

2. The rheology modifying agent according to claim 1, wherein a mass ratio of the compound (1b) to the compound (1a) is 25/75 or more and 40/60 or less.

3. The rheology modifying agent according to claim 1, wherein the compound (1a) is oleyl dimethyl amine oxide.

4. The rheology modifying agent according to claim 1, wherein the two or more types of compounds comprise a compound (11a) represented by the following general formula (11a) and said compound (1b) represented by the following general formula (1b):

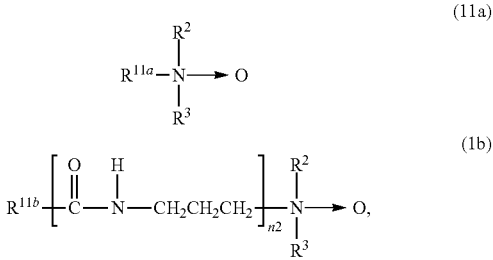

wherein:
   $R^{11a}$ is an alkenyl group with 14 or more and 22 or less carbons; and
   each of $R^2$ and $R^3$ is independently an alkyl group with 1 or more and 4 or less carbons or a group represented by —$(C_2H_4O)_pH$; and
   p is an average number of added moles of $(C_2H_4O)$ and a total for $R^2$ and $R^3$ is a number of 0 or more and 5 or less.

5. The rheology modifying agent according to claim 4, wherein the compound (1b) is a compound in which n2 is 1 to 3 and $R^{11b}$ is an alkenyl group with 13 or more and 21 or less carbons.

6. The rheology modifying agent according to claim 5, wherein a mass ratio of the compound (1b) to the compound (11a) is 25/75 or more and 40/60 or less.

7. The rheology modifying agent according to claim 4, wherein the compound (1b) is oleic acid amido propyl dimethyl amine oxide.

8. The rheology modifying agent according to claim 4, wherein the compound (11a) is oleyl dimethyl amine oxide.

9. The rheology modifying agent according to claim 1, further comprising an anionic aromatic compound.

10. A slurry, comprising:
    the rheology modifying agent according to claim 1;
    water; and
    a powder.

11. The slurry according to claim 10, wherein the powder comprises a hydraulic powder.

12. A method for producing a slurry composition, the method comprising:
   mixing the rheology modifying agent according to claim 1, water, and a powder.

13. The method for producing a slurry composition according to claim 12,
   wherein the method comprises, in the following order:
   mixing water and a powder, to obtain an initial slurry;
   adding and mixing the compound (1a) to the initial slurry, to obtain an intermediate slurry; and then
   adding and mixing the compound (1b) to the intermediate slurry, to obtain the slurry composition.

14. The method according to claim 13, further comprising, after adding the compound (1b):
   adding an anionic aromatic compound.

15. The method according to claim 12, wherein the powder comprises a hydraulic powder.

16. The rheology modifying agent according to claim 7, wherein the compound (11a) is oleyl dimethyl amine oxide.

\* \* \* \* \*